(12) United States Patent
Zhang et al.

(10) Patent No.: US 11,996,924 B2
(45) Date of Patent: May 28, 2024

(54) METHODS, DEVICES AND COMPUTER READABLE MEDIUM FOR ALLOCATING MEASUREMENT RESOURCES

(71) Applicant: Nokia Technologies Oy, Espoo (FI)

(72) Inventors: Li Zhang, Beijing (CN); Lars Dalsgaard, Oulu (FI); Timo Koskela, Oulu (FI); Jorma Kaikkonen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 719 days.

(21) Appl. No.: 17/252,451

(22) PCT Filed: Jun. 22, 2018

(86) PCT No.: PCT/CN2018/092474
§ 371 (c)(1),
(2) Date: Dec. 15, 2020

(87) PCT Pub. No.: WO2019/242015
PCT Pub. Date: Dec. 26, 2019

(65) Prior Publication Data
US 2021/0194563 A1    Jun. 24, 2021

(51) Int. Cl.
*H04B 7/06* (2006.01)
*H04B 17/18* (2015.01)
(Continued)

(52) U.S. Cl.
CPC ......... *H04B 7/0695* (2013.01); *H04B 7/0617* (2013.01); *H04B 17/18* (2015.01); *H04W 24/10* (2013.01); *H04W 76/19* (2018.02)

(58) Field of Classification Search
CPC .... H04B 7/0695; H04B 7/0617; H04B 17/18; H04B 7/06; H04W 24/10; H04W 76/10;
(Continued)

(56) References Cited

U.S. PATENT DOCUMENTS 6,252,854 B1 * 6/2001 Hortensius et al. .......... 370/252
6,728,218 B1 * 4/2004 Corke et al. .................. 370/252
(Continued)

FOREIGN PATENT DOCUMENTS

CN    104509018 A    4/2015
CN    105764106 A    7/2016
(Continued)

OTHER PUBLICATIONS

Zhang et al.: Recovery of Beam Failure In Wireless Communication System; CN 109219972 A. (Year: 2019).*
(Continued)

*Primary Examiner* — Meless N Zewdu
(74) *Attorney, Agent, or Firm* — Barta Jones, PLLC

(57) ABSTRACT

Embodiments of the disclosure provide a method, device and computer readable medium for allocating measurement resources. According to embodiments of the present disclosure, the terminal device can determine the allocations of measurement resources to the RRM measurement and the beam recovery measurement based on priorities of the RRM and beam recovery measurements. The priorities can be determined based on the needs of the terminal device. In this way, the terminal device is able to find suitable beams faster and the interruption time for date transmission is reduced.

20 Claims, 4 Drawing Sheets

(51) Int. Cl.
*H04W 24/10* (2009.01)
*H04W 76/19* (2018.01)

(58) Field of Classification Search
CPC . H04W 36/085; H04W 36/08; H04W 36/083; H04W 72/046; H04W 72/473; H04W 16/28; H04W 36/30; H04W 36/302; H04W 72/56; H04W 52/241; H04W 52/265; H04W 40/12; H04W 36/0044; H04W 28/0967; H04W 28/16; H04W 28/24; H04W 28/26; H04W 28/18; H04W 28/00; H04W 28/0231; H04W 28/0236; H04W 72/0473; H04W 72/12; H04W 72/20; H04W 72/1273; H04W 72/1263; H04W 72/04; H04W 72/0446; H04W 36/0058; H04W 36/0085; H04W 36/0088; H04W 36/0094; H04W 76/19; H04W 72/542; H04W 72/543; H04W 88/00; H04W 88/02; H04W 88/08; H04W 88/18; H94W 76/19; H04L 43/08; H04L 1/248; H04L 1/20

See application file for complete search history.

(56) References Cited

U.S. PATENT DOCUMENTS

| | | | |
|---|---|---|---|
| 11,523,433 B2* | 12/2022 | Agiwal | H04W 74/0833 |
| 11,627,474 B2* | 4/2023 | Yanagisawa et al. | |
| 2017/0195215 A1* | 7/2017 | Gomadam et al. | H04L 45/26 |
| 2018/0110061 A1 | 4/2018 | Chen et al. | |
| 2018/0115940 A1 | 4/2018 | Abedini et al. | |
| 2018/0192371 A1* | 7/2018 | Jung et al. | H04W 52/0216 |
| 2020/0059285 A1* | 2/2020 | Zhang et al. | H04B 7/0695 |
| 2020/0350972 A1* | 11/2020 | Yi et al. | H04B 7/0695 |

FOREIGN PATENT DOCUMENTS

| | | | |
|---|---|---|---|
| CN | 105790886 A | | 7/2016 |
| CN | 106686674 A | | 5/2017 |
| CN | 107734535 A | | 2/2018 |
| CN | 112385290 A | * 2/2021 | ............ H04B 17/18 |
| KR | 2014-0013870 A | | 2/2014 |
| WO | 2018/084798 A1 | | 5/2018 |
| WO | 2019/032882 A1 | | 2/2019 |

OTHER PUBLICATIONS

Yang, Yu: Beam Failure Recovery Method and Terminal; WO 2018196851 A1. (Year: 2018).*
Da Silva Icaro L J: Cell Quality Derivation Configuration; EP 3664309 A1. (Year: 2020).*
Chen et al.: RRM Measurement and Reporting Mechanism of The System of Beam-forming; CN 109257957 A. 2019 (Year: 2019).*
Xu et al.: Electronic Device and Wireless Communication Method in Wireless Communication System; WO 2017076177 A1. (Year: 2017).*
Park et al.: RRM Reporting Method in Wireless Communication System, and Apparatus Supporting Same; WO 2017209505 A1. (Year: 2017).*
CN 112385290 A) >>> Method for Distributing Measuring Resource, Device and Computer Readable Medium )see title; claim 1). (Year: 2021).*
CN 110034832 A) >>> Method and Terminal Device for Monitoring Channel Quality (see title). (Year: 2019).*
"3rd Generation Partnership Project; Technical Specification Group Radio Access Network; NR; Physical layer procedures for control (Release 15)", 3GPP TS 38.213, V15.1.0, Mar. 2018, pp. 1-77.
International Search Report and Written Opinion received for corresponding Patent Cooperation Treaty Application No. PCT/CN2018/092474, dated Apr. 8, 2019, 9 pages.
Extended European Search Report received for corresponding European Patent Application No. 18923434.7, dated Jan. 7, 2022, 12 pages.
"Further views on mechanism to recover from beam failure", 3GPP TSG RAN WG1 #90, R1-1713919, Agenda: 6.1.2.2.7, NTT Docomo Inc, Aug. 21-25, 2017, pp. 1-6.
Office action received for corresponding Indian Patent Application No. 202147001254, dated Jan. 4, 2022, 6 pages.
Office action received for corresponding Chinese Patent Application No. 201880094916.4, dated May 24, 2023, 7 pages of office action and no page of translation available.

* cited by examiner

METHODS, DEVICES AND COMPUTER READABLE MEDIUM FOR ALLOCATING MEASUREMENT RESOURCES

RELATED APPLICATION

This application was originally filed as PCT Application No. PCT/CN2018/092474, filed on Jun. 22, 2018, of which is incorporated herein by reference in its entirety.

FIELD

Embodiments of the present disclosure generally relate to communication techniques, and more particularly, to methods, devices and computer readable medium for allocating measurement resources.

BACKGROUND

In communication systems, such as Long Term Evolved (LTE) communication systems or the $5^{th}$ generation wireless systems (5G), a terminal device performs radio link measurements for multiple purposes. The terminal device may need to perform more than one type of measurement during a specific period of time. Further research is still needed regarding the above situations.

SUMMARY

Generally, embodiments of the present disclosure relate to a method for allocating measurement resources and the corresponding terminal device.

In a first aspect, embodiments of the present disclosure provide a method for communication. The method comprises: monitoring link quality on a first set of beams from a network device. The method further comprises in response to the link quality on the first set of beams being below a threshold quality, determining measurement resources for a first measurement for beam recovery and a second measurement for radio resource management, RRM. The measurement resources comprise the number of beams and measurement time opportunity for the first and second measurements. The method also comprises performing the first and second measurements using the determined measurement resources. The method further comprises obtaining, based on the first and second measurements, a second set of beams with improved link quality.

In a second aspect, embodiments of the disclosure provide a terminal device. The terminal device comprises: at least on processor; and a memory coupled to the at least one processor, the memory storing instructions therein, the instructions, when executed by the at least one processor, causing the terminal device to perform acts including: monitoring link quality on a first set of beams from a network device. The acts further comprise in response to the link quality on the first set of beams being below a threshold quality, determining measurement resources for a first measurement for beam recovery and a second measurement for radio resource management, RRM. The measurement resources comprise the number of beams and measurement time opportunity for the first and second measurements. The acts also comprise performing the first and second measurements using the determined measurement resources. The acts further comprise obtaining, based on the first and second measurements, a second set of beams with improved link quality.

In a third aspect, embodiments of the disclosure prove an apparatus for communication. The apparatus comprises mans for monitoring link quality on a first set of beams from a network device. The apparatus further comprises means for determining measurement resources for a first measurement for beam recovery and a second measurement for radio resource management, RRM, in response to determining a failure in a first set of beams from a network device. The measurement resources comprise the number of beams and measurement time opportunity for the first and second measurements. The apparatus also comprises means for performing the first and second measurements using the determined measurement resources. The apparatus further comprises means for obtaining, based on the first and second measurements, a second set of beams with improved link quality.

In a fourth aspect, embodiments of the disclosure provide a computer readable medium. The computer readable medium stores instructions thereon, the instructions, when executed by at least one processing unit of a machine, causing the machine to implement the method according to the first aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the figures, same or similar reference numbers indicate same or similar elements.

DETAILED DESCRIPTION OF EMBODIMENTS

Figure 1:
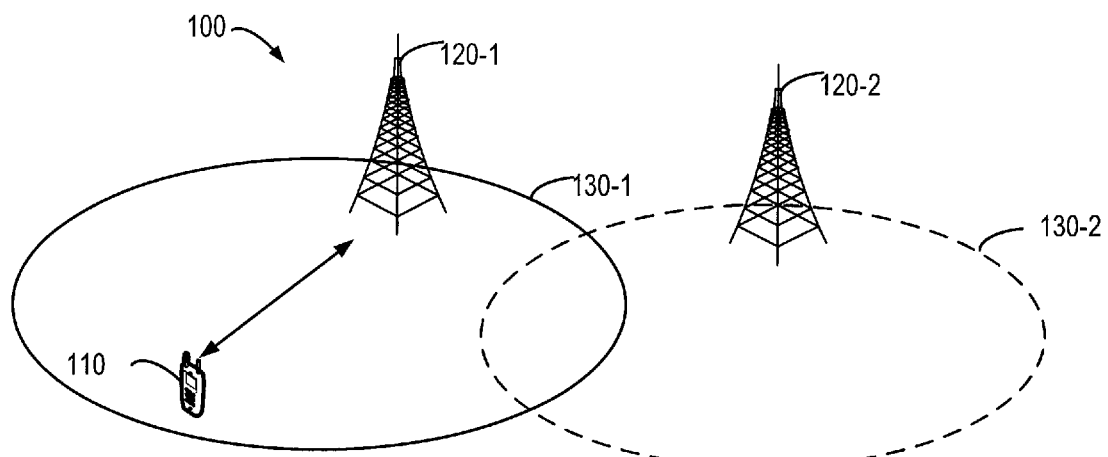
FIG. 1 illustrates a schematic diagram of a communication system according to embodiments of the present disclosure.

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

The term "network device" includes, but not limited to, a base station (BS), a gateway, a management entity, and other suitable device in a communication system. The term "base station" or "BS" represents a node B (NodeB or NB), an evolved NodeB (eNodeB or eNB), a Remote Radio Unit (RRU), a radio header (RH), a remote radio head (RRH), a relay, a low power node such as a femto, a pico, and so forth.

The term "terminal device" includes, but not limited to, "user equipment (UE)" and other suitable end device capable of communicating with the network device. By way of example, the "terminal device" may refer to a terminal, a Mobile Terminal (MT), a Subscriber Station (SS), a Portable Subscriber Station, a Mobile Station (MS), or an Access Terminal (AT).

The term "beam" used herein refers to a reference signal from a network device and/or the spatial filter/antenna pattern used for transmitting reference signal. In similar manner beam may refer an antenna pattern/spatial filter used for receiving signals and performing measurements. The term "measurement for beam recovery" used herein refers to measuring signal quality on a set of reference signals for better or candidate beams in the current serving cell. The term "measurement for radio resource management (RRM) (also known as "RRM measurement" or "L3 Mobility measurements")" used herein refers to measuring signal quality on a set of reference signals for beams in a neighbor cell or to perform measurements to determine serving and neighbor cell qualities for the purpose of L3 mobility or inter-cell mobility. Cell quality may be derived using one or multiple beams.

The term "circuitry" used herein may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with
  software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As discussed above, the terminal device usually performs measurements for different purpose. For example, in the situations of handover, the terminal device may perform RRM measurement to search for better beams from neighbor cell. The RRM measurement may be done in SS block based RRM measurement timing configuration (SMTC) windows. The SMTC windows are usually configured by the network device and configured for a frequency layer. The configurations of the SMTC comprise periodicity, offset and duration of the SMTC windows. In the situations of primary component carrier (PCC) or primary secondary component carrier (PSCC), the terminal device is required to monitor the following number of cells and beams in a continuous manner: If the PCC/PSCC is in FR 1, the terminal device needs to monitor 8 cells and 14 beams. If the PCC/PSCC is in FR 2, the terminal device needs to monitor 6 cells and 24 beams. FR 1 used herein refers to the frequency range which is below 6 GHz and FR 2 used herein refers to the frequency range which is above 24 GHz.

In the situation where the terminal device detects a beam failure, the terminal device may perform the measurement for beam recovery in order to search for new control channel beams (sometimes referred as candidate beams) from the current serving cell.

For example if link quality on each of the first set of beams is below a threshold quality, the terminal device indicates beam failure instance indication to higher layers, i.e., medium access control (MAC) layer. The first set of beams or reference signals, used for beam failure detection may be explicitly configured by network or determined by UE implicitly based on currently active PDCCH beams (the corresponding reference signal of the beam used for transmitting PDCCH). The MAC layer counts the beam failure indication (BFI) instances and declares beam failure when the configured number of instances from lower layer has been indicated.

From measurement opportunity point of view, the measurement for beam recovery and the RRM measurement may be also overlapping in time domain. Thus, the measurement resources may needs to be shared between the measurement for beam recovery and the RRM measurement.

In convention technologies, it discusses the time sharing between the RRM measurement and the radio link monitoring (RLM) measurement. For example, in 3GPP RAN4 #86-bis, a sharing factor is defined for the case where SMTC and RLM-RS are fully overlapping. In RAN4 #87, how to define the sharing factor was discussed without a conclusion. Further, in conventional technologies, it only discusses about the RRM and RLM measurements and the only condition considered for the resource sharing is the configuration of the SMTC and RLM reference signal (RLM-RS). It has not been discussed that how to allocate measurement resources between the RRM measurement and the beam recovery measurement when both of them need to be performed.

In order to at least in part solve above and other potential problems, embodiments of the present disclosure provide solutions for allocating measurement resources. Now some example embodiments of the present disclosure are described below with reference to the figures. However, those skilled in the art would readily appreciate that the detailed description given herein with respect to these figures is for explanatory purpose as the present disclosure extends beyond theses limited embodiments.

FIG. 1 illustrates a schematic diagram of a communication system in which embodiments of the present disclosure can be implemented. The communication system 100, which is a part of a communication network, includes a network device 120-1, a network device 120-2, and a terminal device 110. It is to be understood that the communication system 100 may include any suitable number of terminal devices and network devices. It is to be understood that the number of network devices and terminal devices shown in FIG. 1 is given for the purpose of illustration without suggesting any limitations. It should be noted that the communication system 100 may also include other elements which are omitted for the purpose of clarity.

The terminal device 110 may communicate with the network device 120-1 within the current serving cell 130-1. The terminal device 110 may switch to the neighbor cell 130-2 and communicate with the network device 120-2.

Communications in the communication system 100 may be implemented according to any proper communication protocol(s), including, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, including but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

According to embodiments of the present disclosure, the terminal device 110 can determine the allocations of measurement resources to the RRM measurement and the beam recovery measurement based on priorities of the RRM and beam recovery measurements. The priorities can be determined based on the needs of the terminal device 110. In this way, the terminal device 110 is able to find suitable beams faster and the interruption time for date transmission is reduced.

Figure 2:
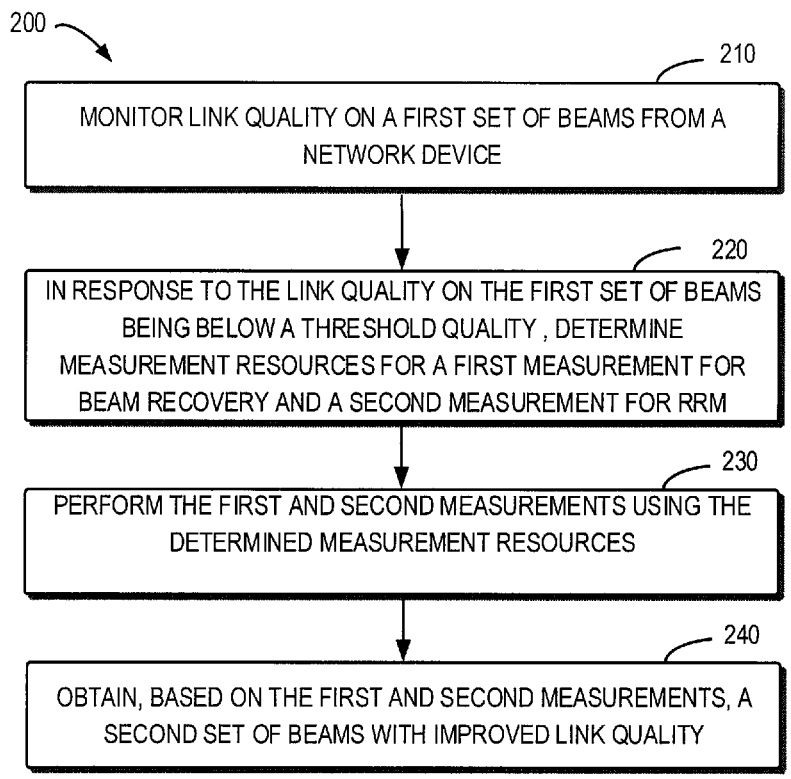
FIG. 2 illustrates a flow chart of a method implemented at a terminal device for communication according to embodiments of the present disclosure.

FIG. 2 illustrates a flow chart of method 200 in accordance with embodiments of the present disclosure. The method 200 may implemented at the terminal device 110 shown in FIG. 1.

At block 210, the terminal device 110 monitors link quality on a first set of beams from the network device 120-1. In some embodiments, the terminal device 110 may detect a change rate of the link quality. For example, if the change rate of the link quality is very fast, the terminal device 110 may be blocked or the terminal device 110 may be turned around by the user. In such situation, it is likely that the terminal device 110 is still in the current serving cell 130-1. If the link quality changes slowly, the terminal device 110 may move to the neighbor cell 130-2.

In other embodiments, the terminal device 110 may also determine quality of link with the network 120-1 and quality of link with the network device 120-2. The terminal device 110 may obtain the difference in quality of link of the network devices 120-1 and 120-2.

At block 220, the terminal device 110 determines measurement resources for a measurement for beam recovery (referred to as "a first measurement") and a measurement for RRM (referred to as "a second measurement") if the link quality on the first set of beams is below a threshold quality. The terminal device 110 may determine the measurement resources based on different conditions. The measurement resources comprise the number of beams that the terminal device 110 can monitor. Alternatively or in addition, the measurement resources also comprise the measurement time opportunity for the terminal device 110 to perform measurements.

Figure 3:
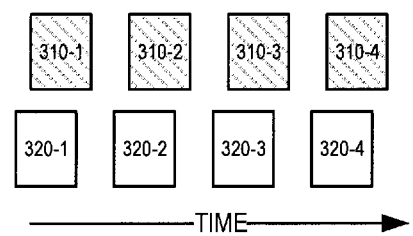
FIG. 3 illustrates a schematic diagram of measurement resources according to embodiments of the present disclosure.

FIG. 3 illustrates a schematic diagram of measuring windows for the RRM and the beam recovery measurements. As shown in FIG. 3, the measuring windows 310-1, 310-2, 310-3 and 310-4 (collectively, the measuring window 310) are used for the beam recovery measurement. The SMTC windows 320-1, 320-2, 320-3 and 320-4 (collectively, the SMTC widow 320) are used for the RRM measurement. It can be seen that the measuring window 310 and the SMTC windows are overlapping in time domain. The terminal device 110 determines measurement resources for the beam recovery measurement and the RRM measurement.

In an example embodiment, the terminal device 110 may determine the allocations of measurement resources based on the change rate of the link quality. If the change rate of the link quality is faster than a threshold rate, it is likely that the terminal device 110 is still in the current serving cell 130-1. The terminal device 110 may allocate more measurement resources to the beam recovery measurement in search for potential candidate beams. For example, fast degradation of radio condition can be defined as reference signal received power (RSRP) or signal interference noise signal (SINR) (or hypothetical PDCCH BLER) of the link decreasing larger than a certain value between two measurement samples or N-measurement samples.

For example, the amount of measurement resources allocate to the beam recovery measurement may be two times than the amount of measurement resources allocated to the RRM measurement. In some embodiments, the exact resource allocation or the ratio of resource allocation may be indicated by the network device 120-1.

If the change rate of the link quality is not above the threshold rate, the terminal device 110 may equally allocate measurement resources to the beam recovery measurement and the RRM measurement. Alternatively, the terminal device 110 may allocate more measurements resources to the RRM measurement if the change rate of the link quality is not above the threshold rate.

In a further example embodiment, if the terminal device 110 is to perform the measurement for beam recovery on beams that are reported (indicated to network) via contention free random access (CFRA), the terminal device 110 may allocate more measurement resources to the measurement for beam recovery. For example, the CFRA beams are specifically configured by network for recovery; CFRA signal indicates a specific downlink reference signal/candidate beam. They are more likely to be suitable beams. In addition, the beam recovery procedure using CFRA may have latency benefit over CBRA beam recovery procedure i.e. the CFRA procedure is using dedicated signals that identity UE performing the recovery whereas the CBRA procedure includes the contention resolution phase. Thus from latency perspective it may be beneficial to prefer the CFRA candidates over the CBRA candidates.

In some embodiments, the modes for allocating measurement resources may be defined as below. It is noted that the modes defined below are only for illustration not limitation.

Mode 1: The terminal device prioritizes beam recovery over RRM with 2:1 (BR:RRM) measurement resource allocation Mode 2: The terminal device prioritizes beam recovery and RRM equally with 1:1 (BR:RRM) measurement resource allocation Mode 3: The terminal device prioritizes RRM over beam recovery with 1:2 (BR:RRM) measurement resource allocation The ratios 2:1, 1:1 and 1:2 are just examples. It is also possible that the exact resource allocation or ratio of resource allocation for each mode is configured by network. The terminal device could then follow the rules described above to switch between different modes.

If the terminal device 110 is to perform the measurement for beam recovery on beams that are reported (indicated to network) via contention based random access (CBRA), the terminal device 110 may equally allocate measurement resources to the measurement for beam recovery and the RRM measurement. For example, the CBRA beams are typically synchronization signal block (SSB) beams, and CBRA candidate beams can be considered as backup or fallback candidates when the CFRA candidate beams are not good i.e. the signal quality is below a network configured threshold or the CFRA candidates are not configured. Alternatively, the terminal device 110 may allocate more measurement resources to the beam recovery measurement and apply different allocation factors for CFRA beams and CBRA beams. In other example embodiments, if the terminal device 110 is to perform the measurement for beam recovery on a reference signals that are configured as radio link monitoring reference signal (RLM-RS), the terminal device 110 may allocate more measurement resources for the beam recovery measurement. That is to say, the terminal device 110 prioritizes beam recovery measurement on RLM-RS over RRM measurements.

As discussed above, the terminal device 110 may also determine quality of link with the network 120-1 and quality of link with the network device 120-2 before the detection of the failure. If the difference in link quality is within in a predetermined range, the terminal device 110 may determine the specific allocations of measurement resources if the failure is detected or if the link quality change faster than a specific threshold.

In one example when the serving cell and neighbor cell qualities were measured to be within a specific range (e.g. within Y-dB) before the beam failure or before determining that link degrades faster than threshold value, the equal scaling, or specifically configured scaling may be applied. In other words, when the serving cell and at least one neighbor cell qualities (or multiple neighbor cells) are within a range the scaling rule described herein may not be applied (as it would otherwise) i.e. use the equal scaling or the scaling prior to failure/degradation conditions.

Alternatively a specific scaling of measurements may be then applied, which may be configured by network. In some embodiments, the terminal device 110 may determine the specific allocations of measurement resources only for the cells that are configured as candidate cells for conditional handover. These cells may have been prepared by network for the terminal device to perform conditionally handover when specific event occurs such as RRC reporting event (for example, A3 where neighbor cell becomes better than serving cell by an offset.

At block 230, the terminal device 110 performs the beam recovery measurement and the RRM measurement using the determine measurement resources. In some embodiments, the terminal device 110 may perform the beam recovery measurement on the beams that are reported via CFRA.

At block 240, the terminal device 110 obtains a second set of beams with improved link quality based on the beam recovery measurement and the RRM measurement. In some embodiments, the terminal device 110 may report the second set of beams to the network device 120-1 via a random access channel (RACH).

In some embodiments, the rule of allocating measurement resources may be reflected in the terminal device measurement requirements for the RRM and beam recovery measurements. Specific allocations of measurement scaling are defined and used based on predetermined conditions, such as beam failure. The rule of allocating measurement resources may also be configured to the terminal device 110.

In some embodiments, an apparatus for performing the method 200 (for example, the terminal device 110) may comprise respective means for performing the corresponding steps in the method 200. These means may be implemented in any suitable manners. For example, it can be implemented by circuitry or software modules.

In some embodiments, the apparatus comprises: means for monitoring link quality on a first set of beams from a network device; means for determining measurement resources for a first measurement for beam recovery and a second measurement for radio resource management, RRM, in response to the link quality on the first set of beams being below a threshold, the measurement resources comprising the number of beams and measurement time opportunity for the first and second measurements; means for performing the first and second measurements using the determined measurement resources; and means for obtaining, based on the first and second measurements, a second set of beams with improved link quality.

In some embodiments, the means for monitoring link quality on a first set of beams from a network device comprises: means for detecting a change rate of the link quality In some embodiments, the means for determining measurement resources for the first and second measurements comprises: means for allocating more measurement resources to the first measurement than the second measurement, in response to the change rate exceeding a threshold rate.

In some embodiments, the means for determining measurement resources for the first and second measurements comprises: means for allocating equal measurement resources to the first measurement and the second measurement, in response to the change rate being below a threshold rate.

In some embodiments, the means for determining measurement resources for the first and second measurements comprises: means for allocating more measurement resources to the first measurement than the second measurement, in response to the first measurement to be performed on beams that are reported via contention free random access.

In some embodiments, the means for determining measurement resources for the first and second measurements comprises: means for allocating equal measurement resources to the first measurement and the second measurement, in response to the first measurement to be performed on beams which are reported via contention based random access.

In some embodiments, the means for determining measurement resources for the first and second measurements comprises: allocating more measurement resources to the first measurement than the second measurement, in response to the first measurement to be performed on a radio link monitoring reference signal (RLM-RS).

In some embodiments, the apparatus further comprises: means for determining quality of a first link with the network device in a serving cell and a second link with a further network device in a neighbor cell; and means for determining the measurement resources for the first and second measurements based on the qualities of the first and second links.

Figure 4:
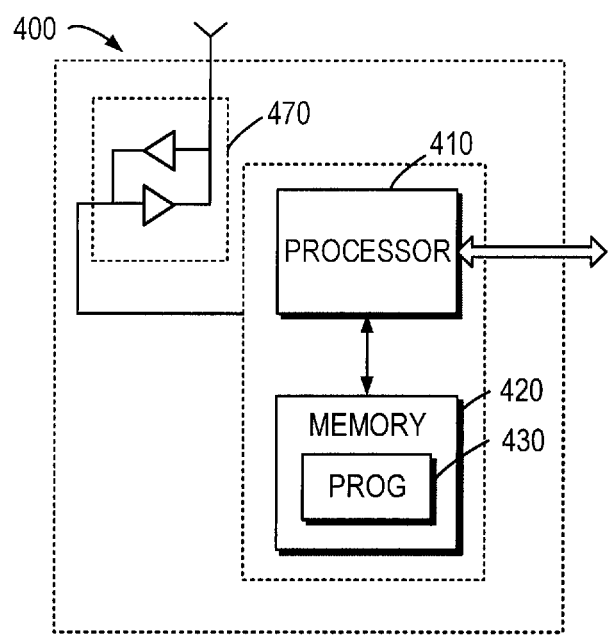
FIG. 4 illustrates a schematic diagram of a device according to embodiments of the present disclosure.

FIG. 4 is a simplified block diagram of a device 400 that is suitable for implementing embodiments of the present disclosure. The device 400 may be implemented at the terminal device 110. As shown, the device 400 includes one or more processors 410, one or more memories 420 coupled to the processor(s) 410, one or more transmitters and/or receivers (TX/RX) 440 coupled to the processor 410.

The processor 410 may be of any type suitable to the local technical network, and may include one or more of general purpose computers, special purpose computers, microprocessors, digital signal processors (DSPs) and processors based on multicore processor architecture, as non-limiting examples. The device 400 may have multiple processors, such as an application specific integrated circuit chip that is slaved in time to a clock which synchronizes the main processor.

The memory 420 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples.

The memory 420 stores at least a part of a program 430. The TX/RX 440 is for bidirectional communications. The TX/RX 440 has at least one antenna to facilitate communication, though in practice an Access Node mentioned in this application may have several ones. The communication interface may represent any interface that is necessary for communication with other network elements.

The program 430 is assumed to include program instructions that, when executed by the associated processor 410, enable the device 400 to operate in accordance with the embodiments of the present disclosure, as discussed herein with reference to FIGS. 2 and 3. That is, embodiments of the present disclosure can be implemented by computer software executable by the processor 410 of the device 400, or by hardware, or by a combination of software and hardware.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purpose of limitation.

What is claimed is:

1. A method for communication, comprising:
monitoring link quality on a first set of beams from a network device by detecting a change rate of the link quality;
in response to the link quality on the first set of beams being below a threshold quality, determining measurement resources for a first measurement for beam recovery and a second measurement for radio resource management (RRM), the measurement resources comprising the number of beams and measurement time opportunity for the first and second measurements;
in response to the change rate exceeding a threshold rate, allocating more measurement resources to the first measurement than the second measurement;
performing the first and second measurements using the determined measurement resources; and
obtaining, based on the first and second measurements, a second set of beams with improved link quality.

2. The method of claim 1, wherein an amount of the measurement resources allocated to the first measurement is two times the amount of measurement resources allocated to the second measurement in response to the change rate exceeding the threshold rate.

3. The method of claim 2, wherein the amount of the measurement resources allocated to the first measurement rad to the second measurement is indicated by the network device.

4. The method of claim 1, wherein determining the measurement resources for the first and second measurements comprises:
in response to the change rate being below the threshold rate, allocating equal measurement resources to the first measurement and the second measurement.

5. The method of claim 1, wherein determining the measurement resources for the first and second measurements comprises:
in response to the first measurement to be performed on beams that are reported via contention free random access, allocating more measurement resources to the first measurement than the second measurement.

6. The method of claim 1, wherein determining the measurement resources for the first and second measurements comprises:
in response to the first measurement to be performed on beams which are reported via contention based random access, allocating equal measurement resources to the first measurement and the second measurement.

7. A terminal device, comprising:
at least one processor; and
a memory coupled to the at least one processor, the memory storing instructions therein, the instructions, when executed by the at least one processor, causing the network device to perform acts including:
monitoring link quality on a first set of beams from a network device by detecting a change rate of the link quality;
in response to the link quality on the first set of beams being below a threshold quality, determining measurement resources for a first measurement for beam recovery and a second measurement for radio resource management, (RRM), the measurement resources comprising the number of beams and measurement time opportunity for the first and second measurements;
in response to the change rate exceeding a threshold rate, allocating more measurement resources to the first measurement than the second measurement;
performing the first and second measurements using the determined measurement resources; and
obtaining, based on the first and second measurements, a second set of beams with improved link quality.

8. The terminal device of claim 7, wherein an amount of the measurement resources allocated to the first measurement is two times the amount of measurement resources allocated to the second measurement in response to the change rate exceeding the threshold rate.

9. The terminal device of claim 8, wherein the amount of the measurement resources allocated to the first measurement and to the second measurement is indicated by the network device.

10. The terminal device of claim 8, wherein determining the measurement resources for the first and second measurements comprises:
in response to the change rate being below the threshold rate, allocating equal measurement resources to the first measurement and the second measurement.

11. The terminal device of claim 7, wherein determining the measurement resources for the first and second measurements comprises:
in response to the first measurement to be performed on beams which are reported via contention based random access, allocating equal measurement resources to the first measurement and the second measurement.

12. The terminal device of claim 7, wherein determining the measurement resources for the first and second measurements comprises:
in response to the first measurement to be performed on beams which are reported via contention based random access, allocating equal measurement resources to the first measurement and the second measurement.

13. The terminal device of claim 7, wherein determining the measurement resources for the first and second measurements comprises:
in response to the first measurement to be performed on a radio link monitoring reference signal (RLM-RS), allocating more measurement resources to the first measurement than the second measurement.

14. An apparatus for communication, comprising:
means for monitoring link quality on a first set of beams from a network device by detecting a change rate of the link quality;
means for determining measurement resources for a first measurement for beam recovery and a second measurement for radio resource management, (RRM), in response to the link quality on the first set of beams being below a threshold quality, the measurement resources comprising the number of beams and measurement time opportunity for the first and second measurements;
means for, in response to the change rate exceeding a threshold rate, allocating more measurement resources to the first measurement than the second measurement;
means for performing the first and second measurements using the determined measurement resources; and
means for obtaining, based on the first and second measurements, a second set of beams with improved link quality.

15. The apparatus of claim 14,
wherein an amount of the measurement resources allocated to the first measurement is two times the amount of the measurement resources al located to the second measurement in response to the change rate exceeding the threshold rate.

16. The apparatus of claim 15, wherein the amount of the measurement resources allocated to the first measurement and to the second measurement is indicated by the network device.

17. The apparatus of claim 15, wherein the means for determining the measurement resources for the first and second measurements comprises:

means for allocating equal measurement resources to the first measurement and the second measurement, in response to the change rate being below the threshold rate.

18. The apparatus of claim 14, wherein the means for determining the measurement resources for the first and second measurements comprises:
means for allocating more measurement resources to the first measurement than the second measurement, in response to the first measurement to be performed on beams that are reported via contention free random access.

19. The apparatus of claim 14, wherein the means for determining the measurement resources for the first and second measurements comprises:
means for allocating equal measurement resources to the first measurement and the second measurement, in response to the first measurement to be performed on beams which are reported via contention based random access.

20. The apparatus of claim 14, wherein the means for determining the measurement resources for the first and second measurements comprises:
means for allocating more measurement resources to the first measurement than the second measurement, in response to the first measurement to be performed on a radio link monitoring reference signal (RLM-RS).

* * * * *